United States Patent
Stölzer et al.

[11] 3,860,646
[45] Jan. 14, 1975

[54] HALOGENOALKANESULFONIC ACID AMIDES

[75] Inventors: Claus Stölzer, Wuppertal; Ingeborg Hammann, Cologne; Günther Unterstenhöfer, Opladen, all of Germany

[73] Assignee: Bayer Aktiengesellschaft, Leverkusen, Germany

[22] Filed: Apr. 3, 1973

[21] Appl. No.: 347,537

[30] Foreign Application Priority Data
Apr. 11, 1972 Germany............................ 2217245

[52] U.S. Cl....... 260/556 A, 260/465 E, 260/556 F, 424/304, 424/321
[51] Int. Cl............................................ C07c 143/74
[58] Field of Search ..................... 260/556 A, 556 F

[56] References Cited
UNITED STATES PATENTS
3,412,149  11/1968  Schlor et al.................... 260/556 A OTHER PUBLICATIONS
C.A. 73: 108737 S (1970) Okuda et al.

*Primary Examiner*—Norma S. Milestone
*Assistant Examiner*—S. D. Winters
*Attorney, Agent, or Firm*—Burgess, Dinklage & Sprung

[57] ABSTRACT

Halogenoalkanesulfonic acid amides of the formula

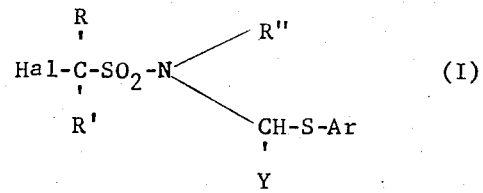

in which
R and R' each independently is hydrogen, halogen, alkyl of up to 6 carbon atoms, or halogen-substituted alkyl of up to 6 carbon atoms,
Hal is halogen,
R'' is hydrogen, alkyl of up to 6 carbon atoms or lower alkenyl,
Y is hydrogen or trichloromethyl, and
Ar is phenyl, naphthyl, benzyl or phenylethyl, optionally substituted by fluorine, chlorine, bromine, nitro, nitrile, trifluoromethyl, trichloromethyl, lower alkyl, lower alkoxy, lower alkylmercapto or lower alkenyl,
which possess acaricidal and fungicidal properties.

9 Claims, No Drawings

HALOGENOALKANESULFONIC ACID AMIDES

The present invention relates to and has for its objects the provision of particular new halogenoalkanesulfonic acid amides of phenyl-, naphthyl- phenylalkyl-thiomethylamines which possess acaricidal and fungicidal properties, active compositions in the form of mixtures of such compounds with solid and liquid dispersible carrier vehicles, and methods for producing such compounds and for using such compounds in a new way especially for combating pests, e.g., acarids and fungi, especially acarids, with other and further objects becoming apparent from a study of the within specification and accompanying examples.

It is known from U.S. Pat. No. 2,618,583 and J. Sci. Food Agr. Volume 5 (1954), page 323 that certain sulfonic acid derivatives, for example benzenesulfonic acid 2,4-dichlorophenyl ester, possess an acaricidal action, but their action is not always entirely satisfactory, especially if low concentrations are used.

The present invention provides, as new compounds, the halogenoalkanesulfonic acid amides of the general formula

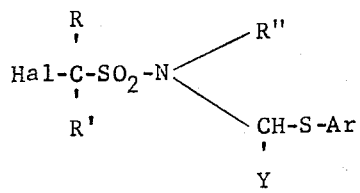  (I)

in which
R and R' each independently is hydrogen, halogen, alkyl of up to 6 carbon atoms, or halogen-substituted alkyl of up to 6 carbon atoms,
Hal is halogen,
R'' is hydrogen, alkyl of up to 6 carbon atoms or lower alkenyl,
Y is hydrogen or trichloromethyl, and
Ar is phenyl, naphthyl, benzyl or phenylethyl, optionally substituted by fluorine, chlorine, bromine, nitro, nitrile, trifluoromethyl, trichloromethyl, lower alkyl, lower alkoxy, lower alkylmercapto or lower alkenyl.

Preferably R and R' each is hydrogen, chlorine, fluorine, methyl, ethyl, propyl or perfluoro-loweralkyl of up to 4 carbon atoms; R'' is hydrogen, straight-chain or branched lower alkyl of up to 4 carbon atoms or allyl; Hal is fluorine or chlorine; and Ar is phenyl, naphthyl or benzyl optionally substituted by chlorine, fluorine, trifluoromethyl, lower alkylmercapto or lower alkyl of up to 4 carbon atoms.

Surprisingly, the halogenalkanesulfonic acid amides according to the invention show a considerably better acaricidal action than even commercially available acaricides, such as N-methyl-(4-methylmercapto-3,5-dimethyl)-phenylcarbamate (Compound A) or O,O -d-imethyl-S-(2-ethylmercapto)ethyl-thiophosphoric acid ester (Compound B) of British Pat. No. 912,895; German Pat. No. 836,349; and U.S. Pat. No. 2,571,989.

The present invention also provides a process for the production of a halogenoalkanesulfonic acid amide of the formula (I) in which
a. a halogenoalkanesulfonic acid amide of the general formula

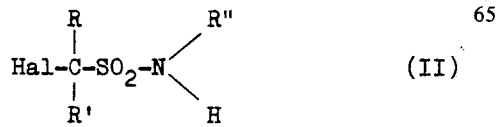  (II)

is reacted with paraformaldehyde, which is represented by the formula

  (III), and thionyl chloride, which has the formula

  (IV), or anhydrous hydrogen chloride (HCl), to give a chloromethyl compound of the general formula

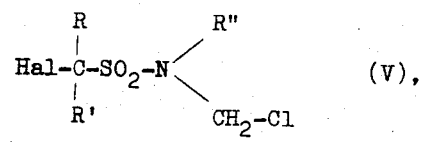  (V), the compound (V) being then reacted with a mercaptan or thiophenol of the general formula $$HS-Ar$$

(VI)

the latter being reacted in the presence of an agent which splits off acids, or in the form of a salt thereof, or b. a halogenoalkanesulfonic acid amide of the formula (II) above is heated with paraformaldehyde of the formula (III) above or chloral, which has the formula

  (VII), and a mercaptan or thiophenol of the formula (VI) above, in the presence of an acid catalyst, until the stoichiometric amount of water has been separated off,
in which formulae In particular, the new halogenoalkanesulfonic acid amides are also effective against resistant strains of spider mites. The compounds according to the invention thus represent an enrichment of the art.

If chloromethanesulfonic acid monomethylamide, paraformaldehyde, thionyl chloride and sodium 4-chlorothiophenolate are used as starting materials in process variant (a), the course of the reaction can be represented by the following equations:

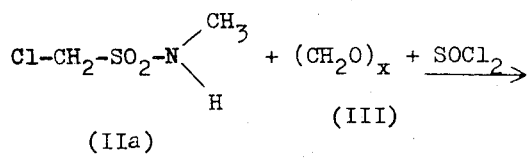

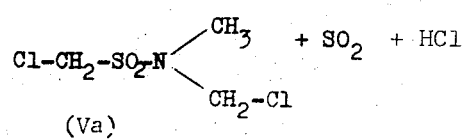

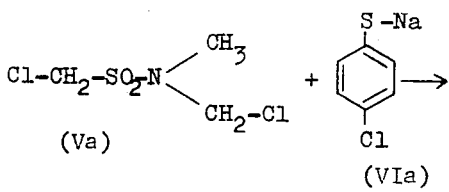

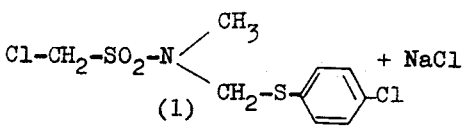

If chloromethanesulfonic acid amide, chloral and thiophenol are used as starting materials in process variant (b), and 4-toluenesulfonic acid is used as the catalyst, the course of the reaction can be represented by the following equation:

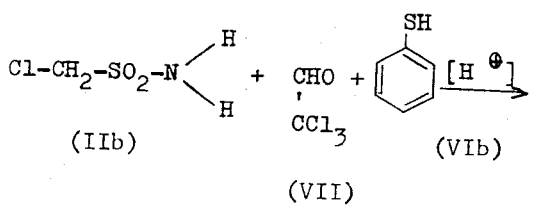

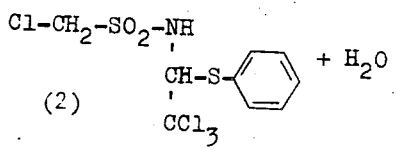

The preparative process variants are both preferably carried out with the use of a suitable solvent or diluent. As such it is possible to use practically all inert organic solvents, especially aliphatic and aromatic, optionally chlorinated hydrocarbons, such as benzene, toluene, xylene, benzine, methylene chloride, chloroform, carbon tetrachloride, chlorobenzene; ethers such as diethyl ether, dibutyl ether and dioxane; ketones, for example acetone, methyl ethyl ketone, methyl isopropyl ketone and methyl isobutyl ketone; nitriles, such as acetonitrile and propionitrile; and alcohols, such as methanol, ethanol and isopropanol.

In process variant (a), the first reaction step is preferably carried out in aliphatic or aromatic hydrocarbons or chlorinated hydrocarbons as the diluent and the second reaction step in the presence of aprotic polar solvents. In process variant (b), hydrocarbons or chlorinated hydrocarbons with boiling points between 80°C and 140°C are preferably used.

The reaction temperature can be varied over a fairly wide range. In general, the reaction is carried out at about 0° to 140°C, preferred temperatures in process variant (a), in the first and second stages, being 15° to 60°C and preferred temperatures in process variant (b) being 80° to 140°C. The reaction is generally carried out under normal pressure.

Acid substances, for example p-toluenesulfonic acid, hydrochloric acid and acid ion exchangers are preferably used as catalysts for process variant (b).

To carry out the process, the starting materials are in most cases employed in equimolar ratios. An excess of one or other reactant results in no significant advantages. The reaction is preferably carried out in the presence of one of the above-mentioned diluents, at the indicated temperatures; after stirring for several hours, the reaction mixture is worked up in the usual manner, and in the course thereof the chloromethyl compounds (V) should preferably not be treated with water.

The substances according to the invention are obtained as crystalline products or in the form of pale-colored, viscous, water-insoluble oils which can sometimes be distilled without decomposition but which, because of their viscosity, generally do not show sharp boiling points. It is preferable to free them of the last volatile constituents by heating to moderately elevated temperatures under reduced pressure, and to purify them in this way. They are characterized above all by the refractive index and, in the case of solid compounds, by the melting point.

As has already been mentioned, the new halogenoalkanesulfonic acid amides are distinguished by an outstanding acaricidal activity. Many representatives of this class of compounds furthermore have a fungicidal action.

With the mites (Acarina) there are classed, in particular, the spider mites (Tetranychidae) such as the twospotted spider mite (*Tetranychus urticae*) and the European red mite (*Paratetranychus pilosus* = *Panonychus ulmi*), gall mites, for example the blackcurrent gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

At the same time, the new compounds display a low phytotoxicity and most of them are only slightly toxic towards warm-blooded animals. For these reasons, the compounds according to the invention may be employed successfully as pesticides.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g., chlorobenzenes, etc.), cycloalkanes (e.g., cyclohexane, etc.), paraffins (e.g. petroleum or mineral oil fractions), chlorinated aliphatic hydrocarbons (e.g., methylene chloride, chloroethylenes, etc.), alcohols (e.g., methanol, ethanol, propanol, butanol, glycol, etc.) as well as ethers and esters thereof (e.g., glycol monomethyl ether, etc.), amines (e.g., ethanolamine, etc.), amides (e.g. dimethyl formamide, etc.), sulfoxides (e.g., dimethyl sulfoxide, etc.), acetonitrile, ketones (e.g., acetone, methyl ethyl ketone, methyl isobutyl ketone, cyclohexanone, etc.), and/or water; as well as inert dispersible finely divided solid carriers, such as ground natural minerals (e.g., kaolins, clays, alimina, silica, chalk, i.e. calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, and fungicides, or insecticides, rodenticides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5–90 percent by weight, of the mixture, whereas carrier composition mixtures suitable for direct application or field application generally contemplate those in which the active compound is present in an amount substantially between about 0.0001–10 percent, preferably 0.01–1 percent, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50-100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g. about 20–100 percent by weight of the active compound.

Furthermore, the present invention contemplates methods of selectively killing, combating or controlling pests, e.g. acarids and fungi, more particularly methods of combating acarids, which comprises applying to at least one of correspondingly (a) such acarids, (b) such fungi, and (c) the corresponding habitat thereof, i.e., the locus to be protected, a correspondingly combative or toxic amount, i.e. an acaricidally or fungicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrustation, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Tetranychus/carbamate-resistant test
Solvent: 3 parts by weight of dimethylformamide
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Bean plants (*Phaseolus vulgaris*), which had a height of approximately 10 – 30 cm, were sprayed with the preparation of the active compound until dripping wet. These bean plants were heavily infested with the two-spotted spider mite (*Tetranychus urticae*/carbamate-resistant) in all stages of development.

After the specified periods of time, the effectiveness of the preparation of active compound was determined by counting the dead mites. The degree of destruction thus obtained is expressed in percent. 100 percent means that all the spider mites were killed and 0 percent means that no spider mites were killed.

The active compounds, the concentrations of the active compound, the evaluation times and the results can be seen from the following table:

Table 1

(mites which damage plants)

Tetranychus urticae/carbamate-resistant)

| Active compounds | | Active compound concentration in % by weight | Degree of destruction in % after 8 days |
|---|---|---|---|
| $CH_3S-\underset{CH_3}{\overset{CH_3}{C_6H_2}}-O-\overset{O}{\underset{\parallel}{C}}-NH-CH_3$ (known) | (A) | 0.1 | 0 |
| $Cl-CH_2-SO_2-N(CH_3)(CH_2-S-C_6H_5)$ | (3) | 0.1 | 95 |
| $Cl-CH_2-SO_2-N(CH_3)(CH_2-S-C_6H_4-Cl)$ (ortho) | (4) | 0.1 | 95 |
| $Cl-CH_2-SO_2-N(CH_3)(CH_2-S-C_6H_4-Cl)$ (meta) | (5) | 0.1 / 0.02 | 100 / 50 |
| $Cl-CH_2-SO_2-N(CH_3)(CH_2-S-C_6H_4-Cl)$ (para) | (1) | 0.1 / 0.02 | 100 / 100 |
| $Cl-CH_2-SO_2-N(CH_3)(CH_2-S-C_6H_3Cl_2)$ | (10) | 0.1 / 0.02 | 100 / 50 |
| $Cl-CH_2-SO_2-N(CH_3)(CH_2-S-C_6H_3(CF_3)(Cl))$ | (23) | 0.1 / 0.02 | 100 / 60 |
| $Cl-CFCl-SO_2-N(CH_3)(CH_2-S-C_6H_4-Cl)$ | (24) | 0.1 / 0.02 | 100 / 100 |

EXAMPLE 2

Tetranychus test (resistant)
Solvent: 3 parts by weight of dimethylformamide
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Bean plants (*Phaseolus vulgaris*), which had a height of approximately 10 – 30 cm, were sprayed with the preparation of the active compound until dripping wet. These bean plants were heavily infested with the common or two-spotted spider mite (*Tetranychus urticae*) in all stages of development.

After the specified periods of time, the effectiveness of the preparation of active compound was determined by counting the dead mites. The degree of destruction thus obtained is expressed in percent. 100 percent means that all the spider mites were killed and 0 percent means that no spider mites were killed.

The active compounds, the concentrations of the active compound, the evaluation times and the results can be seen from the following table:

Table 2

(mites which damage plants)

Tetranychus test (resistant)

| Active compounds | Active compound concentration in % by weight | Degree of destruction in % after 2 days |
|---|---|---|
| $(CH_3O)_2\overset{O}{P}-S-CH_2-CH_2-SC_2H_5$ (known) (B) | 0.1<br>0.01 | 95<br>0 |
| $Cl-CH_2-SO_2-N(CH_3)(CH_2-S-C_6H_4-Cl)$ (4) [ortho-Cl] | 0.1<br>0.01 | 98<br>90 |
| $Cl-CH_2-SO_2-N(CH_3)(CH_2-S-C_6H_4-Cl)$ (5) [meta-Cl] | 0.1<br>0.01 | 99<br>60 |
| $Cl-CH_2-SO_2-N(CH_3)(CH_2-S-C_6H_4-Cl)$ (1) [para-Cl] | 0.1<br>0.01 | 100<br>98 |
| $Cl-CH_2-SO_2-N(CH_3)(CH_2-S-C_6H_3Cl_2)$ (9) | 0.1<br>0.01 | 100<br>50 |
| $Cl-CH_2-SO_2-N(CH_3)(CH_2-S-C_6H_3Cl_2)$ (10) | 0.1<br>0.01 | 100<br>80 |
| $Cl-CH_2-SO_2-N(CH_3)(CH_2-S-C_6H_3(CF_3)(Cl))$ (23) | 0.1<br>0.01<br>0.001 | 100<br>98<br>40 |
| $Cl-CH_2-SO_2-N(i-C_3H_7)(CH_2-S-C_6H_4-Cl)$ (14) | 0.1<br>0.01 | 100<br>50 |
| $Cl-CFCl-SO_2-N(CH_3)(CH_2-S-C_6H_4-Cl)$ (24) | 0.1<br>0.01<br>0.001 | 100<br>100<br>60 |
| $Cl-CH_2-SO_2-NH-CH_2-S-C_6H_5$ (30) | 0.1<br>0.01 | 100<br>90 |

The process of this invention is illustrated in and by the following preparative Examples.

EXAMPLE 3

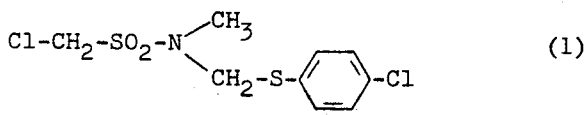

(1)

50.4 g (1.68 mole) of paraformaldehyde were first added to a solution of 229.9 g (1.60 mole) of chloromethanesulfonic acid monomethylamide in 1,000 ml of dichloromethane, and thereafter 199.9 g (1.68 mole) of thionyl chloride were added gradually. The reaction took place only slightly exothermically, with evolution of hydrogen chloride and sulfur dioxide. The mixture was left overnight at room temperature with stirring; a slight amount of cloudy matter was filtered off and the filtrate was concentrated, twice treated with 300 ml of toluene at a time and again concentrated. Remnants of hydrogen chloride and of thionyl chloride were largely removed in this way. Chloromethanesulfonic acid N-methyl-N- chloromethylamide was obtained as a yellow oil with a refractive index $n_D^{23}$ of 1.4964. Yield: 293.1 g (95.4 percent of theory).

A solution of 234.0 g (1.2 moles) of chloromethanesulfonic acid N-methyl-N-chloromethylamide in 500 ml of acetonitrile was added dropwise at room temperature to a suspension of 240.0 g (1.60 mole) of sodium 4-chlorothiophenolate in 1,000 ml of acetonitrile. The reaction took place exothermically and sodium chloride separated out. The temperature was kept below 35°C. The mixture was left overnight with stirring, the sodium chloride was filtered off and the filtrate was concentrated. The residue was taken up in dichloromethane, the solution was washed with dilute sodium hydroxide solution and subsequently with water until a neutral reaction was obtained, the organic phase was dried over sodium sulfate and filtered off, and the filtrate was concentrated. Chloromethanesulfonic acid N-methyl-N-(4-chlorophenylthio)methylamide was obtained as a yellowish oil with a refractive index $n_D^{22}$ of 1.5882 and a boiling point of 180°–190°C/2.5 mm Hg. Yield: 284.0 g (78.8 percent of theory).

EXAMPLE 4

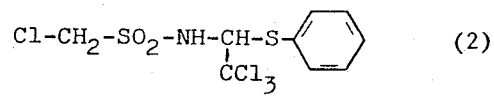

A mixture of 25.9 g (0.20 mole) of chloromethanesulfonic acid amide, 32.3 g of chloral (0.22 mole), 20.4 g (0.20 mole) of thiophenol, 0.2 g of 4-toluenesulfonic acid and 300 ml of toluene was heated under reflux while connected to a water separator. After 24 hours, the reaction was stopped, unreacted starting amide was filtered off and the filtrate was dried over sodium sulfate and concentrated after filtration. The resulting crude product (37.0 g) on chromatographic purification with silica gel yielded chloromethanesulfonic acid (1-phenylthio-2,2,2-trichloro)-ethylamide of melting point 81° – 83°C. Yield: 15.7 g (21.2 percent of theory).

The following compounds were prepared by processes analogous to those described above.

Formula — Physical data (refractive index; boiling point (b.p.) in °C/mmHg; melting point (m.p.) in °C)

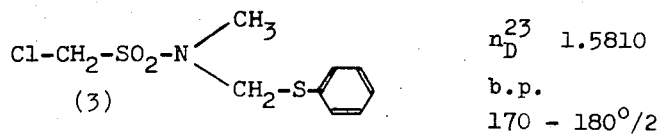

$n_D^{23}$ 1.5810
b.p. 170 – 180°/2

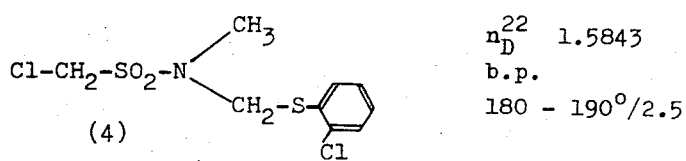

$n_D^{22}$ 1.5843
b.p. 180 – 190°/2.5

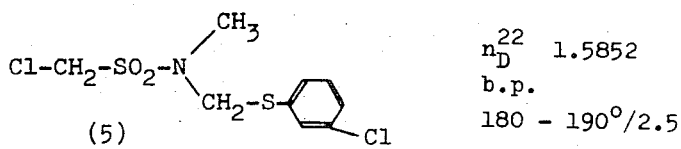

$n_D^{22}$ 1.5852
b.p. 180 – 190°/2.5

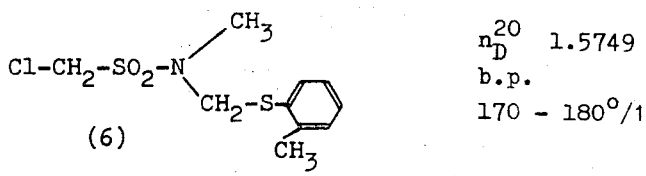

$n_D^{20}$ 1.5749
b.p. 170 – 180°/1

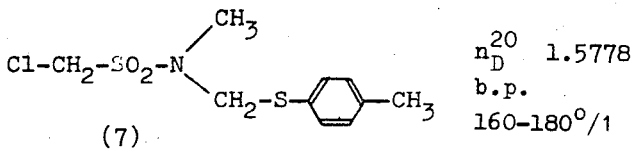

$n_D^{20}$ 1.5778
b.p. 160–180°/1

| Formula | Physical data (refractive index; boiling point (b.p.) in °C/mmHg; melting point (m.p.) in °C) |
|---|---|
| 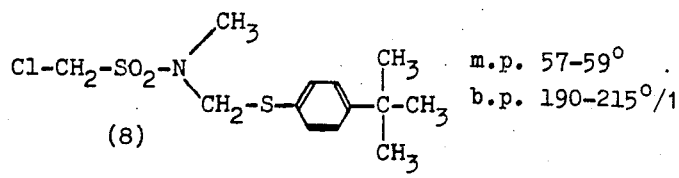 (8) | m.p. 57–59° b.p. 190–215°/1 |
| 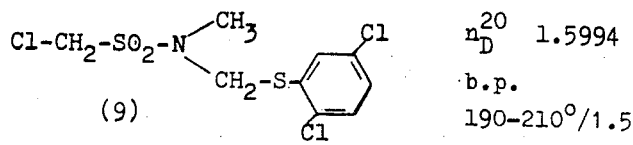 (9) | $n_D^{20}$ 1.5994 b.p. 190–210°/1.5 |
| 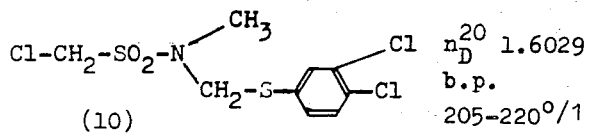 (10) | $n_D^{20}$ 1.6029 b.p. 205–220°/1 |
| 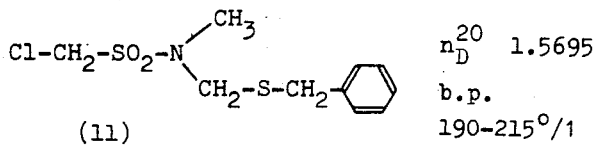 (11) | $n_D^{20}$ 1.5695 b.p. 190–215°/1 |
| 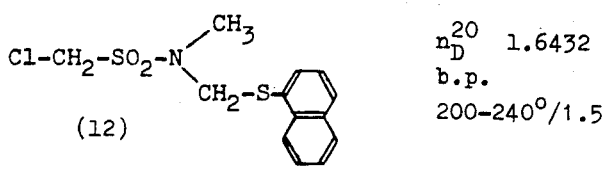 (12) | $n_D^{20}$ 1.6432 b.p. 200–240°/1.5 |
| 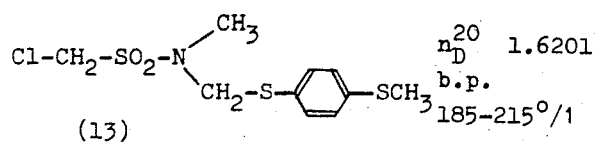 (13) | $n_D^{20}$ 1.6201 b.p. 185–215°/1 |
| 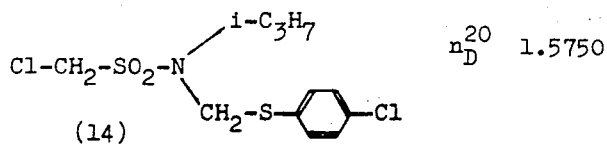 (14) | $n_D^{20}$ 1.5750 |
| 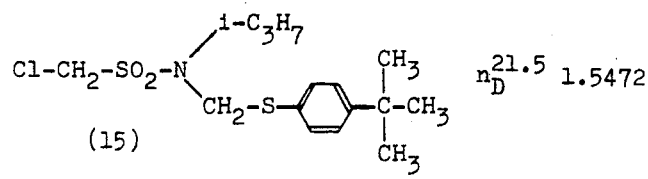 (15) | $n_D^{21.5}$ 1.5472 |
| 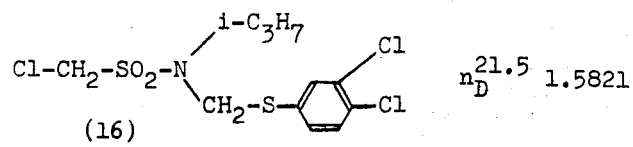 (16) | $n_D^{21.5}$ 1.5821 |

| Formula | Physical data (refractive index; boiling point (b.p.) in °C/mmHg; melting point (m.p.) in °C) |
|---|---|
| 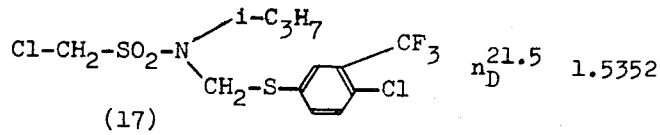 (17) | $n_D^{21.5}$ 1.5352 |
| 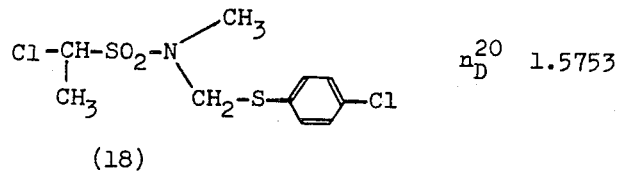 (18) | $n_D^{20}$ 1.5753 |
| 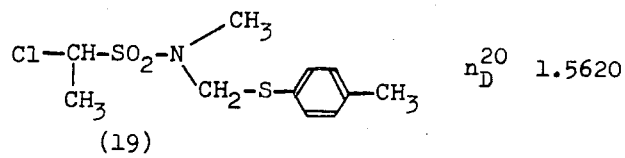 (19) | $n_D^{20}$ 1.5620 |
| 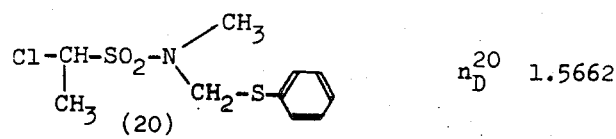 (20) | $n_D^{20}$ 1.5662 |
| 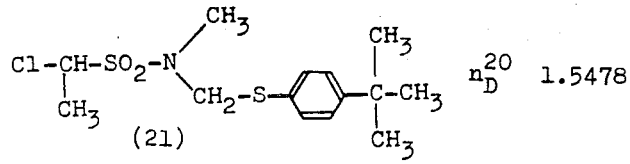 (21) | $n_D^{20}$ 1.5478 |
| 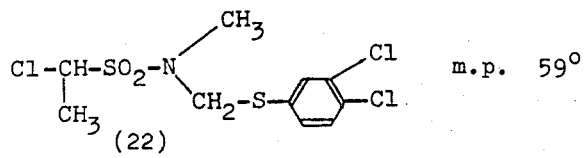 (22) | m.p. 59° |
| 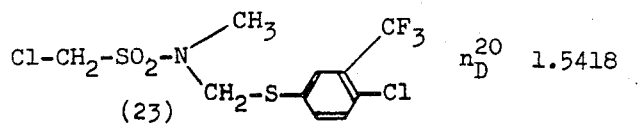 (23) | $n_D^{20}$ 1.5418 |
| 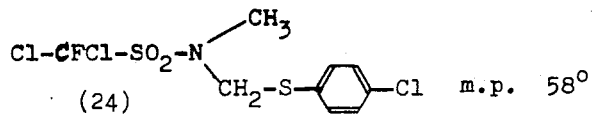 (24) | m.p. 58° |
| 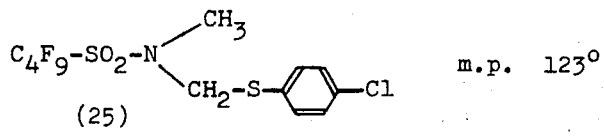 (25) | m.p. 123° |

| Formula | Physical data (refractive index; boiling point (b.p.) in °C/mmHg; melting point (m.p.) in °C) |
|---|---|
| 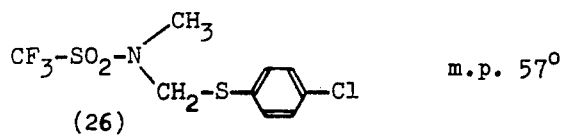 (26) | m.p. 57° |
| 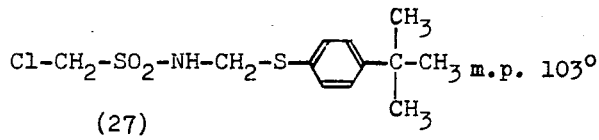 (27) | m.p. 103° |
| 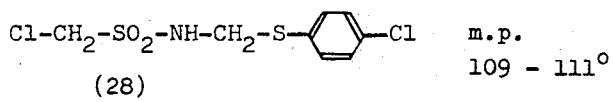 (28) | m.p. 109 – 111° |
| 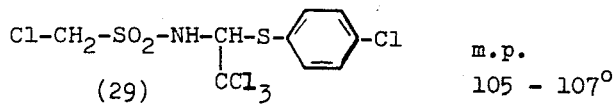 (29) | m.p. 105 – 107° |
| 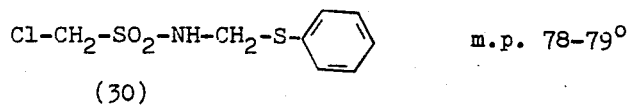 (30) | m.p. 78–79° |
| 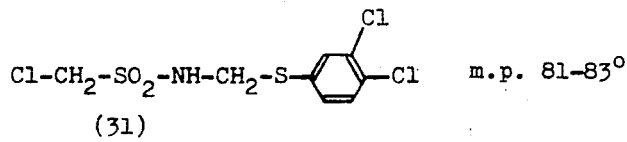 (31) | m.p. 81–83° |
Other compounds which can be similarly prepared include:
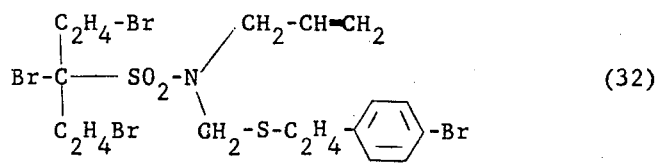 (32)
 (33)
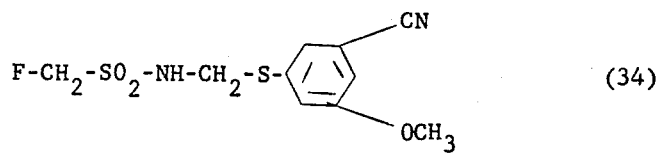 (34)
 (35)
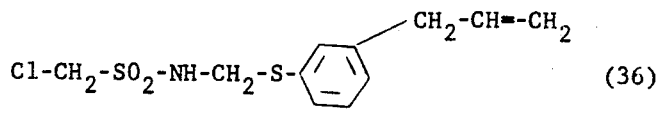 (36)

It will be appreciated that the instant specification and examples are set forth by way of illustration and not limitation, and that various modifications and changes may be made without departing from the spirit and scope of the present invention.

What is claimed is:

1. A halogenoalkanesulfonic acid amide of the formula

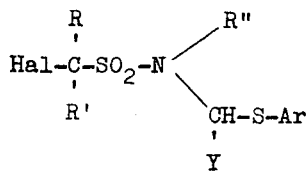
(I)

in which
R and R' each independently is hydrogen, halogen, alkyl of up to 6 carbon atoms, or halogen-substituted alkyl of up to 6 carbon atoms,
Hal is halogen,
R'' is hydrogen, alkyl of up to 6 carbon atoms or lower alkenyl,
Y is hydrogen or trichloromethyl, and
Ar is phenyl, naphthyl, benzyl or phenylethyl, optionally substituted by fluorine, chlorine, bromine, nitro, nitrile, trifluoromethyl, trichloromethyl, lower alkyl, lower alkoxy, lower alkylmercapto or lower alkenyl.

2. A compound according to claim 1, in which R and R' each independently is hydrogen, chlorine, fluorine, methyl, ethyl, propyl or perfluoro-lower alkyl; R'' is hydrogen, lower alkyl or allyl; Hal is fluorine or chlorine; and Ar is phenyl, naphthyl or benzyl optionally substituted by chlorine, fluorine, trifluoromethyl, lower alkylmercapto or lower alkyl.

3. The compound according to claim 1 wherein such compound is chloromethanesulfonic acid N-methyl-N-(4-chlorophenylthio)-methylamide of the formula

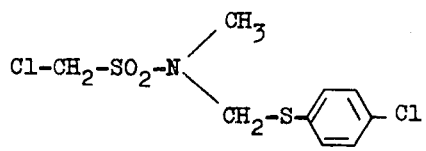
(1)

4. The compound according to claim 1 wherein such compound is chloromethanesulfonic acid N-methyl-N-(2-chlorophenylthio)-methylamide of the formula

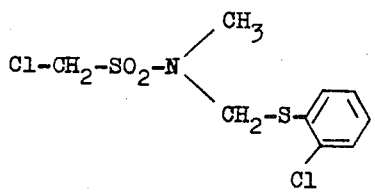
(4)

5. The compound according to claim 1 wherein such compound is chloromethanesulfonic acid N-methyl-N-(3-chlorophenylthio)-methylamide of the formula

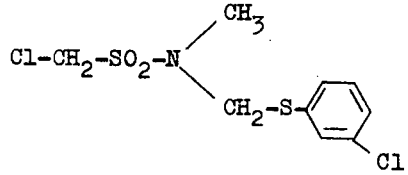
(5)

6. The compound according to claim 1 wherein such compound is chloromethanesulfonic acid N-methyl-N-(3-trifluoromethyl-4-chlorophenylthio)-methylamide of the formula

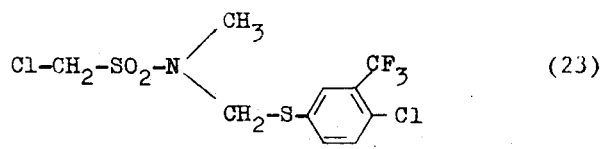
(23)

7. The compound according to claim 1 wherein such compound is fluorodichloromethanesulfonic acid N-methyl-N-(4-chlorophenylthio)-methylamide of the formula

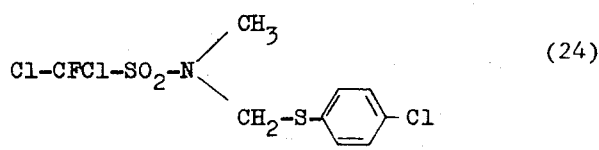
(24)

8. A process for the production of a compound according to claim 1, comprising reacting a halogenoalkanesulfonic acid amide of the formula

(II)

with paraformaldehyde and thionyl chloride or anhydrous hydrogen chloride, to give the chloromethyl compound of the formula

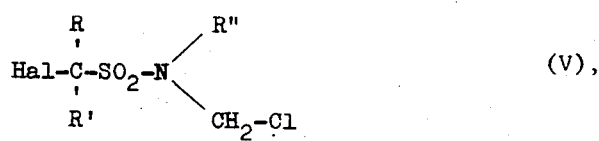
(V), the compound (V) then being reacted with the sodium salt of a mercaptan or thiophenol of the formula HS-Ar

(VI).

9. A process for the production of a compound according to claim 1, comprising heating a halogenoalkanesulfonic acid amide of the formula

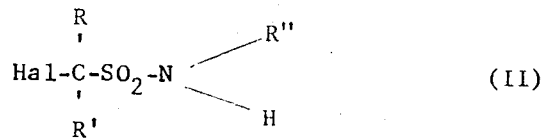
(II)

with paraformaldehyde or chloral and with a mercaptan or thiophenol of the formula HS-Ar

(VI)

in the presence of a catalyst selected from the group consisting of hydrochloric acid, p-toluenesulfonic acid and an acid ion exchanger, until the stoichiometric amount of water has been separated off.

* * * * *